United States Patent [19]

Hunter, Jr. et al.

[11] 4,174,174
[45] Nov. 13, 1979

[54] COMPOSING REDUCING CAMERA

[75] Inventors: Robert K. Hunter, Jr., Northridge; David A. Grafton, Santa Monica; Joseph Lander, Covina; Lauren V. Merritt, Sierra Madre; Donald E. Stewart, Arcadia; Donald H. Wolpert, Los Angeles, all of Calif.

[73] Assignee: Xerox Corporation, Stamford, Conn.

[21] Appl. No.: 777,866

[22] Filed: Mar. 15, 1977

[51] Int. Cl.$^2$ .................. G03B 27/46; G03B 27/32
[52] U.S. Cl. ........................ 355/39; 355/54; 355/77; 355/64
[58] Field of Search ................ 355/39–43, 355/53, 54, 64, 65, 77, 95, 96

[56] References Cited

U.S. PATENT DOCUMENTS

| | | | |
|---|---|---|---|
| 3,740,136 | 6/1973 | Maloney et al. | 355/65 |
| 3,824,336 | 7/1974 | Gould et al. | 355/53 |
| 3,907,426 | 9/1975 | Goodliffe | 355/54 |
| 3,987,467 | 10/1976 | Cowles | 355/40 |
| 3,998,544 | 12/1976 | Pass et al. | 355/54 |
| 4,047,813 | 9/1977 | Spence-Bate | 355/54 X |
| 4,068,945 | 1/1978 | Spence-Bate | 355/54 |

*Primary Examiner*—L. T. Hix
*Assistant Examiner*—W. J. Brady

*Attorney, Agent, or Firm*—Irving Keschner; Franklyn C. Weiss

[57] ABSTRACT

Apparatus for automatically producing microfiche from microfilm and microfilm from microfilm in different formats or reductions. In particular, a reel of microfilm having frames of sequentially recorded photographic images thereon is loaded into a microfilm film transport and the microfilm is automatically stepped, frame by frame, past a film-illuminating device. The frames on the microfilm are reduced in size by a reducing lens and imaged at a plane within a microfilm recorder device. The microfilm recorder device is automatically controlled in a manner whereby film contained therein is movable in two dimensions in a plane which is coplanar with the image focal plane. The movement of the film is such that a plurality of frames or microimages arranged in columns and rows and corresponding to the microfilm frames being illuminated are arranged on the film in a preselected microfiche format. The apparatus includes an automatic optical titling device which titles each microfiche with information provided by a keyboard operator. Optical pagination is also provided for imposing additional page numbers on the individual frames on the microfiche, if so desired.

4 Claims, 13 Drawing Figures

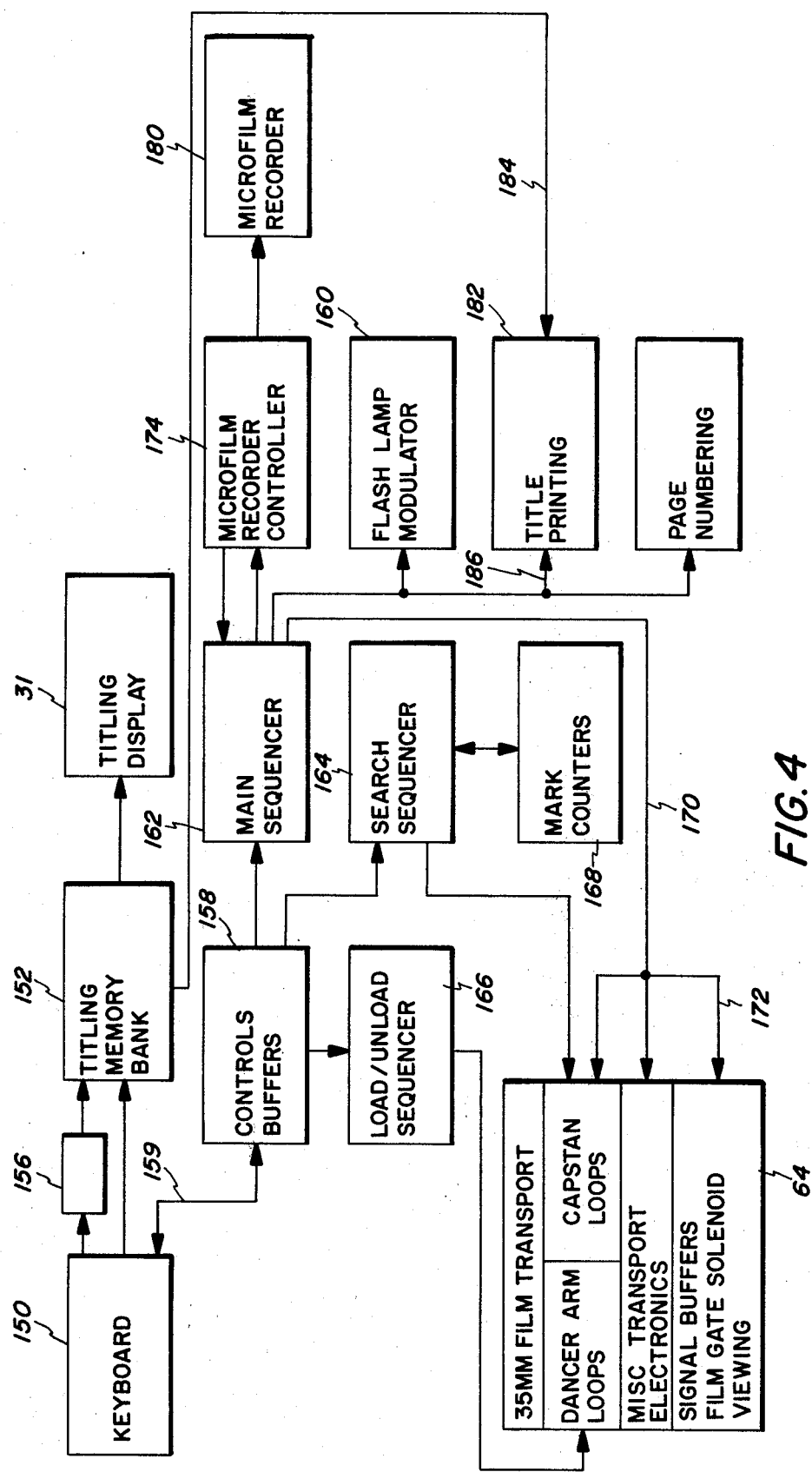

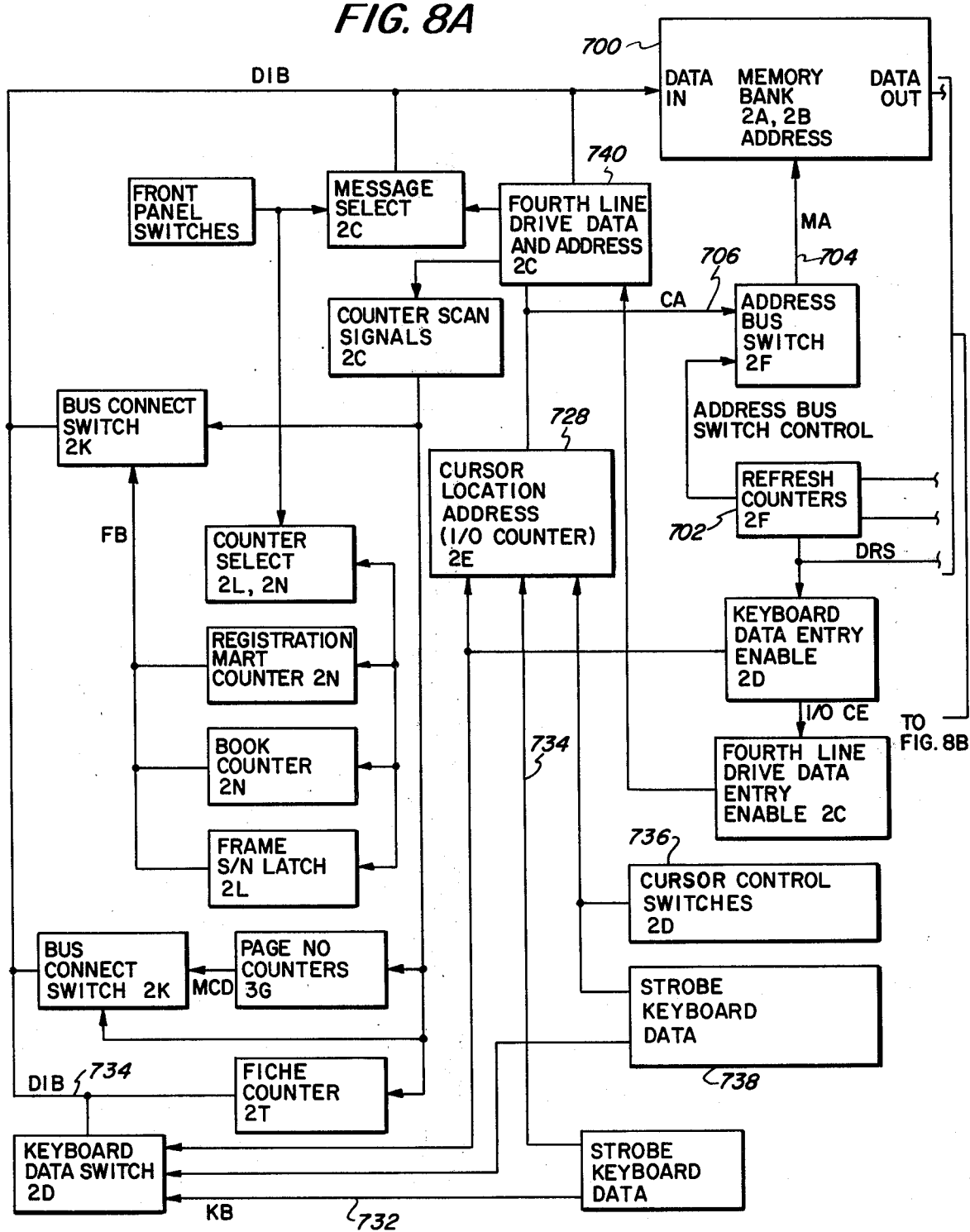

COMPOSING REDUCING CAMERA

BACKGROUND OF THE INVENTION

The utilization of microfilm for the storage of large volumes of data has become increasingly required in recent years as the steadily increasing size of various industries, and especially the archival documentation including rare books and especially out of print documents.

The use of microfilm having images serially recorded thereon is limited in certain respects. The most significant limitation is the arduous task of accessing the microfilms. In addition, the amount of information which can be recorded is limited to the input microfilm format selected. Further, the storage of each microfilm reel requires sufficient physical space which may not be readily available for large users of microfilm.

In the field of microfilming, a microfiche is a single sheet of film containing sequences of microimages and is provided with a border area for titles, authors, names, classification data, etc., which can be read by the unaided eye. A microfiche is an ideal form for containing related images and is unsurpassed when compared to prior art systems of microfilming for economy, storage, ease of handling and print-out for images that represent many pages of a single report or books that are to be occasionally or rextensively reproduced for wide distribution. A microfiche may contain any number of images depending upon the size of the input document and the reduction ratio.

Microfiche is considered superior to microfilm reels in convenience of handling and copying. The accessability of photographic information on a microfiche also is distinctly superior to photographic information on reels.

Microfiche camera arrangements for converting a filmstrip into photographic frames on a fiche have been disclosed in the prior art. For example, U.S. Pat. No. 3,682,546 discloses a fiche camera for exposing frames of a filmstrip which subsequently is converted to a matrix array of photographic frames on a fiche, the camera including a transport mechanism for advancing the film, a shutter for exposing the photographic frames of the filmstrip, and fiche coordinate counting means which is operated each time the shutter is operated. The fiche coordinate counting means counts the frames in each column of a fiche, the number of columns and the number of fiche in a reel of film in a cartridge.

Prior art fiche camera arrangements, as exemplified by the aforementioned patent, require a manual intervention step in order to form the microfiche. Since the demand for archivial material has recently increased dramatically any manual steps in the conversion of 35 mm microfilm to microfiche are undesirable.

SUMMARY OF THE PRESENT INVENTION

The present invention provides an apparatus for automatically converting the format microfilm and more particularly for producing microfiche from microfilm. In particular, a reel of microfilm having frames of sequentially recorded photographic images thereon is loaded into a microfilm film transport and the microfilm is automatically stepped, frame by frame, past a film-illuminating device. The frames on the microfilm are reduced in size by a reducing lens and imaged at a plane within a microfilm recorder device. The microfilm recorder device is automatically controlled in a manner whereby film contained therein is movable in two dimensions in a plane which is coplanar with the image focal plane. The movement of the film is such that a plurality of frames, or microimages arranged in columns and rows and corresponding to the microfilm frames being illuminated, are formed on the film in a preselected format. The apparatus includes an automatic optical titling device which titles each microfiche with information provided by a keyboard operator. An optical pagination system is also provided for selected page numbering of the individual frames on the microfiche.

More specifically, there is provided a composing reducing camera, CRC, which automatically produces microfilm and microfiche in a variety of formats and reduction ratios from roll microfilm input. A microfilm transport device is provided for accepting rows of input microfilm and then transporting the microfilm to a filming gate where individual microfilm frames are stopped and registered in the filming gate. The mechanism rewinds the film after use. An illumination device is provided which exposes individual frames in the filming gate as the microfilm is automatically stepped frame by frame through the filming gate. Various reducing lens systems are employed for imaging the input microfilm frames with high optical resolution at various reduction ratios to a plane coplanar with the plane of the filming gate. A camera means is employed to accept the reduced images from the reducing lens at a focal plane within the recorder. The microfilm camera is automatically controlled in synchronism with the film transport device to position the output microfilm or microfiche in two dimensions in the focal plane of the recording device resulting in a plurality of reduced microimages arranged in columns and rows corresponding to a preselected format. A TV view screen, i.e. television monitor is employed for displaying the contents of any frame desired during any of the operations of the system. An optical photocomposition means or a tilting device is employed to provide eye readable titles on the microfiche when the output from the system is in a microfiche format. An optical pagination system may be employed for printing page numbers sequentially on the individual frames of the output microfilm or microfiche. An automatic search capability means is employed for searching the input row film at a high rated speed to register a selected and coded frame in the film gate. The control system electronics comprises a number of control modules which automatically sequence all of the electronic and mechanical operations of the system.

It is an object of the present invention to provide apparatus for automatically producing microfiche from microfilm.

It is a further object of the present invention to provide apparatus for automatically producing microfiche from microfilm wherein photographic images sequentially recorded on microfilm are optically reduced and reimaged at selected locations on film to form a microfiche.

It is still another object of the present invention to provide apparatus for automatically producing microfiche from microfilm wherein photographic images sequentially recorded on microfilm are optically reduced and reimaged at selected locations on a film positionable in two dimensions to form the microfiche, the apparatus further including means for optically titling each microfiche with information provided by a keyboard operator and means for selected page numbering of the individual frames on the microfiche.

DESCRIPTION OF THE DRAWINGS

For a better understanding of the invention as well as other objects and further features thereof, reference is made to the following description which is to be read in conjunction with the following drawings wherein:

FIG. 4 is a block diagram of the control electronics of the composing reducing camera.

FIGS. 8A and 8B is seen a block diagram of the titling system.

DETAILED DESCRIPTION OF THE DRAWINGS

Figure 1:
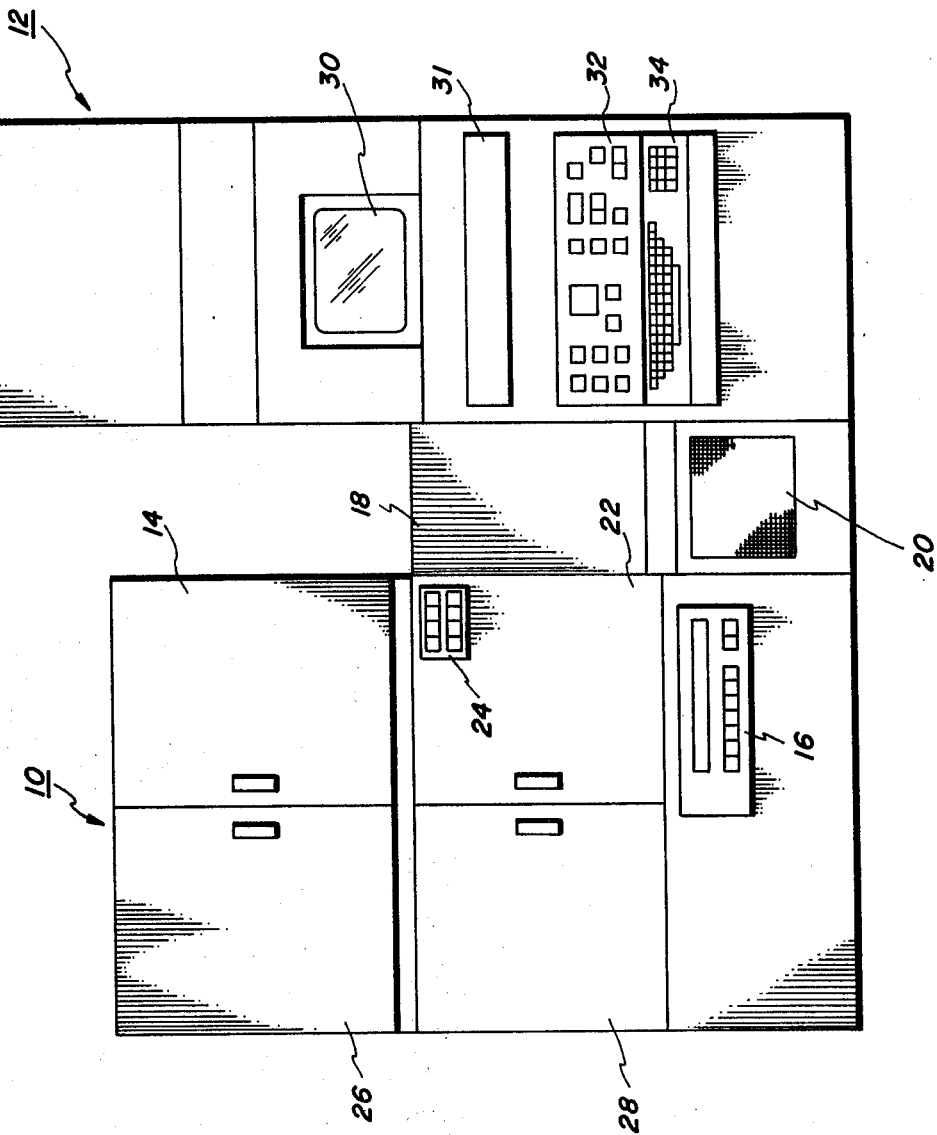
FIG. 1 is a perspective view of the apparatus embodying the present invention.

FIG. 1 shows a perspective view of the apparatus of the present invention. The apparatus comprises a main frame unit 10 and a control console unit 12, both units being electronically interconnected. Main frame unit 10 comprises a section 14 which contains a microfilm transport unit, a microfilm recorder controller front panel 16, the microfilm recorder controller being contained therein, a receptacle 18 for storing the microfilm recorder, an enclosure 20 for supporting auxilliary system equipment such as power supplies, blowers, etc., an area 22 for supporting the film transport controls and including panel 24 for controlling the loading operation and system indicators, such as camera ready, an area 26 for supporting the electronics necessary to cause the printing lamps (set forth hereinafter in more detail) to fire, an area 28 which incorporates the electronics necessary to cause the titling lamp (set forth hereinafter in more detail) to fire and the titling lamp assembly. Console unit 12 comprises a television monitor 30, main control panel controls and indicators 32 (including system status indicators and the microfilm and microfiche positioning controls) and typewriter keyboard controls 34 which allow an operator, inter alia, to enter information directly into the titling display as will be set forth hereinafter in more detail. It should be noted that the general configuration of the system shown in the figure is set forth to provide the reader with a frame of reference for the description to follow. However, the invention is directed to selected features of the system, i.e. the automatic conversion of microfilm to microfiche and the optical titling of the microfiche which will be described in specific detail hereinafter.

Figure 2:
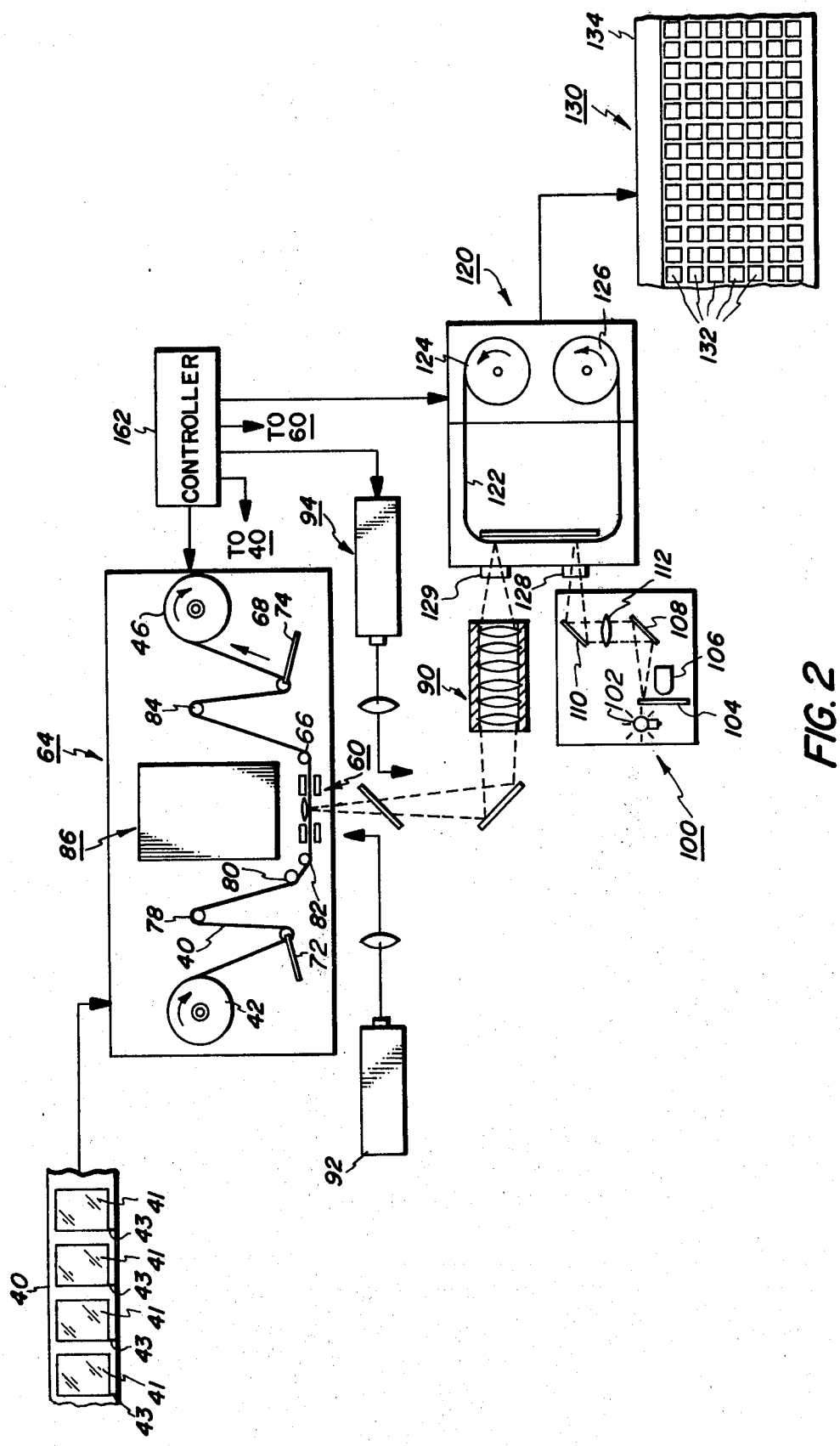
FIG. 2 is a simplified functional schematic of the system of the present invention.

Referring to FIG. 2, a simplified functional schematic of the system of the present invention is illustrated. The input of the system comprises microfilm filmstrip 40 having a plurality of frames 41 thereon and wound on supply reel 42. The microfilm 40 is preferably 35 mm silver halide microfilm of the negative type and the image sense (orientation) thereof is conventional. The system is capable of producing microfiche with the input imagery in either cine or comic formats. In order that a desired (and selected) microfiche output format be provided the input image size, the mask dimensions of the film transport gate, the system optical reduction ratios, and image orientation must be selected to be consistent with the selected output format. For example, if the desired output is a standard NMA A1 microfiche with a cell size of 10 mm times 12.5 mm, then the gate mask dimensions, the otpical reduction ratio and the allowable maximum image size must be of consistent value.

To assure precise registration of the microfilm in the film gate of the system in the automatic operating mode, certain masks are used to position the frame in the gate. Although the actual marking of the microfilm is not part of the present invention, the mark may comprise, for example, a opaque bar 43 adjacent each edge of the microfilm frame such that when illuminated on one side thereof, a detector on the other side of the mark generates an electrical signal indicating that a particular frame is positioned appropriately in the film gate.

The film transport mechanism for transporting the input microfilm 40 is indicated by reference numeral 64. The transport mechanism 64 is utilized to move the input microfilm 40 from supply reel 42 to take-up reel 46 in the direction of arrow 68 through a film gate 60 in an intermittent movement by corresponding supply arm take-up reel motors. Also included in transport mechanism 64 are dancer arms 72 and 74 for controlling tension of the film 70 as it is unwound from reel 42. Capstan 66, driven by a motor drive system (not shown), moves the microfilm 40 in the direction of arrow 68. Guide rollers 78, 80, 82 and 84 guide the microfilm 40 along desired path.

The transport system 64 operates as follows:

The input microfilm 40 is threaded through the film transport 64 in a manner whereby the leader end of the microfilm 40 is wound on takeup reel 46. The system is activated when an operator depresses a switch on system control panel 24 shown in FIG. 1 whereby the reel driving motors are activated causing the microfilm 40 to be placed under tension, the tension being supplied by the spring loaded dancer arm assemblies 72 and 74. The system is then considered to be in the "loaded" condition with the dancer arms 72 and 74 coming to rest in approximately the horizontal position. In this condition, capstan 66 is able to drive the microfilm forward (in the direction of arrow 68) or in the reverse direction through the film gate 60 automatically by a control sequencer (described in detail hereinafter). Nominal film transport speeds are 100 inches per second in the fast forward or fast reverse modes and 15 inches per second in the automatic operating mode. Although a manual mode of operation can be provided by the present system, the system operation described hereinafter will only describe automatic operating since this is a key feature of the present invention. In the automatic operating mode, the system processes each microfilm frame in a step and repeat manner. The steps in the cycle required to photograph one frame of the microfilm 40 as a corresponding microimage on the microfiche are as follows:

(1) film 40 is caused to advance under a velocity servo control system until a frame location mark 43 is sensed by a detector (not shown) located in the film gate 60;

(2) the system is switched to a position servo mode whereby the microfilm 40 is caused to be precisely positioned in film gate 60 at the correct position with respect to the defining aperture in gate 60;

(3) the upper half of film gate 60, which is movable is lowered to hold the film 40 flat against the glass platen portion of gate 60 of which defines the object plane of the optical system;

(4) a microfilm illuminating lamp 86 is energized;

(5) the upper half of the film gate 60 is raised, and (6) the film 40 is again advanced under velocity servo control to the next frame where the cycle is repeated.

These events are programmed and controlled as part of a sequencer system to accomplish automatic operation as will be described hereinafter in more detail. The platen which establishes the defining aperture at the object plane of the system is preferably made of glass and mounted in a replaceable holder. Depending on the format of the microfilm 40 and the desired microfiche format, the platen is selected and inserted in film gate 60. The registration mark detector for each platen is a part of the replaceable assembly.

The transport system 64 described is designed to achieve operation at up to 10 frames per second but the actual speed is dependent on the format being processed, the separation distance between microfilm frames and the microfiche format selected. The reduction lenses 90 utilized in the system should be selected to provide an appropriate reduction ratio e.g. 1.2×, 1.4× or 2.0× reductions among others. The illumination system 86 includes apparatus to provide the luminous energy required to expose the microfiche film in both printing and titling modes as will be described hereinafter. The basic illuminator chosen was a shortarc xenon flash lamp with the amount of energy per flash and the flash duration selected to conform to the particular requirements of the system. The illumination system will be described in more detail hereinafter with reference to FIG. 6.

A TV viewing camera 92 is provided to allow an operator to view any or all frames being selected for printing.

An optical titling system 100, comprising a titling lamp 102, its drive electronics (which are not shown), titling disc 104, disc drive motor 106, mirrors 108 and 110 and lens 112, functions to optically present titling information on a predetermined area of the microfiche being produced.

The preferred microfilm recorder 120 selected for use in the system is the TDC (Terminal Data Corporation) DMF-3B Multiformat Microimage Recorder which comprises a main camera body and an electronic film positioning system, the film 122 being driven forward from supply reel 124 to take-up reel 126 or in reverse as required. This camera provides all required movements of the microfiche film 122 requested by the system control functions.

The commercially available microfilm recorder 120 was modified to allow the use of optical titling system 100. In particular, the image from titling disc 104 is reflected from mirror 110 and focused onto the titling area of film 122 via an aperture 128 in the microfilm recorder. The on-line capabilities of the recorder were utilized to respond to instructions from the main sequencer of the system as will be described hereinafter. The resulting output from microfiche recorder 120, after cutting, is a microfiche 130.

As set forth hereinabove, the size of a microfiche will determine the number of frames or microimages that comprise it. For example, the fiche illustrated in FIG. 2 is nominally a 4×6-inch and contains 98 single frames. These frames are arranged in seven rows, running horizontally, as viewed in FIG. 3, and fourteen columns running vertically.

Generally, the fiche 130 is provided with a narrow marginal area 134 upon which is printed, or otherwise placed for reading by the unaided eye, the title of the subject matter contained in the frames of the fiche, the author, or any other useful information, file data summary, etc.

Figure 3A:
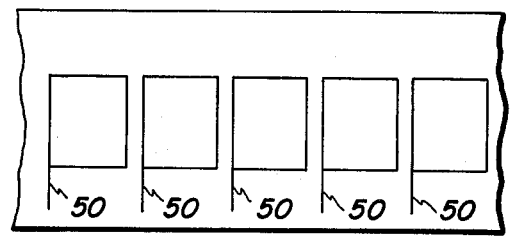
FIGS. 3A, 3B, 3C, and 3D are schematic illustrations of typical microfilm input formats.
Figure 3B:
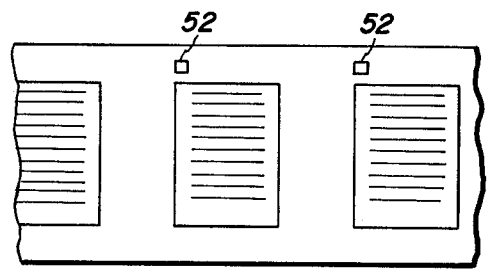
Figure 3C:
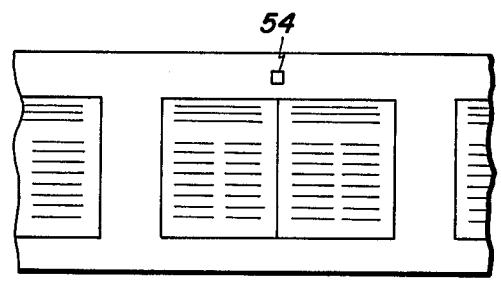
Figure 3D:
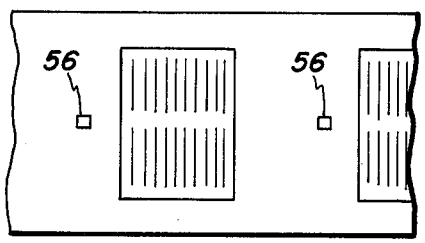

FIGS. 3(a)–3(d) illustrate typical input microfilm formats. In particular, FIG. 3(a) shows a single page comic mode with marks 50 for indicating where the film is to be cut. FIG. 3(b) is similar to FIG. 3(a) except that registration marks 52 are used; FIG. 3(c) shows a double page comic mode with registration marks 54, and FIG. 3(d) shows a double-page cine mode format with registration marks 56.

Additional microfilm input formats may be utilized, the only requirement being that for an input format selected, a corresponding lens reduction ratio and output microfiche format must be selected. Once an input format is selected, the keyboard operator, may, for example, insert the desired reducing lens in the system and program the microfilm recorder to produce the appropriate output microfiche format.

In FIG. 4 is the functional block diagram of the control system utilized in the present invention. A keyboard 150 is provided to allow, inter alia, data entry into titling memory bank 152. The keyboard 150 generates a seven line ASCII code in response to an operator striking a key on keyboard 150. The ASCII code is stored in titling memory bank 152. A read strobe signal from keyboard 150 is used to operate a counter (not shown) which controls the location of a cursor that appears on titling display 31 (shown in FIG. 1). Thus each key depression enters data into a memory cell within memory bank 152 and then moves an address counter (I/O counter) 156 onto the next memory cell within memory bank 152. It should be noted that the keyboard 150 and memory bank 152 interface asynchronously.

The titling display 31 may comprise, for example, a standard gas display which can display alpha-numeric characters in the form of a dot array such as a 5×7 dot matrix. A gas discharge display must be refreshed continually. A refresh counter (not shown) searches the memory bank 152 to determine what goes in each row for the particular column of interest. The column of interest is energized, the appropriate data is put on a row line and is held there for a number of microseconds. Memory bank 152 is searched again for the next column of information and that information is held for an additional period of time. This cycle repeats continuously and synchronously. Once the memory bank has been searched for the required row data, that row data is stored in an extra memory bank (not shown in the figure). During the time memory bank 152 is used by the refresh circuitry, keyboard 150 is locked out from the memory bank 152 during the refresh operation. When a title is actually being printed on the microfiche the keyboard is also locked out. A display cursor may be utilized to trace out the title on the display as the title is being printed on the microfiche.

All operator controls are push-button switches, the pushing of a particular button being recorded in control buffers 158, the control buffers 158 also interlocking keyboard 150 for the conditions set forth hereinabove via lead 159. For example, an automatic exposure can be executed only when an expose enable button is engaged, a search operation simultaneously being inhibited as will be set forth hereinafter. The control buffer 158 comprises a series of input buffered flip-flops. These flip-flops also control the lamp drivers in flash lamp modulator 160 which turn on the lamps required for titling and printing via main sequencer 162 described in more detail hereinafter.

There are three control or sequencer devices which control the actual operations of the system of the present invention. They comprise the main sequencer 162, a search sequencer 164 and the load/unload sequencer 166. The search sequencer 164 comprises combinational logic, flip-flop and gates arranged to perform the desired function, the output thereof being coupled to microfilm film transport 64. The load/unload sequencer 166 comprises flip-flops and logic gates organized for various distinct states, the output thereof being coupled to film transport 64. Since sequences 164 and 166 are generally state of the art they may be the same. The main sequencer 162, described in more detail hereinafter, is essentially a microprocessor which delivers a number of distinct machine level commands and a number of system operational commands. The load/unload sequencer 166 controls the film transport 64 during the loading and unloading of the film 40. At the beginning of the load, the motor driving capstan 66 is checked to ensure that it is not rotating. Then dancer arms 72 and 74 of the film transport 64 are caused to be positioned to the operating position by applying correct voltage and signals to the motors driving reels 42 and 46 via sequencer 166. Once the dancer arms 72 and 74 are up, the film transport 64 is termed loaded. The film transport 64 will be considered unloaded when the dancer arms reach limit stops which occur when too much positive or negative swing is present. The load/unload sequencer 166 is inhibited from operation when any of the other sequencers are in operation.

The search sequencer 164 controls the film transport 64 when a search is being executed, the microfilm film frame selected for photography as a microimage being determined by setting appropriate switches as will be described hereinafter.

When a search is initiated by appropriate selection of data entry switches on panel 32 (FIG. 1), the film transport 64 is accelerated to a speed of approximately 100 inches per second. A comparison is continually made between the search destination and the input setting and the status of the mark counters 168. When the comparison is made, film 40 is decelerated to a zero speed. Due to the fact that the film overshoots the desired position, the film is caused to reverse its direction under controlled accelerations. After film reversal, the film travels at a selected speed until a match is again recorded between the counters and the input data and the film transport 64 is then stopped. A technique for accurately stopping the film at a desired position is described in copending application Ser. No. 755,407, filed Dec. 29, 1976, now U.S. Pat. No. 4,095,732

The operational state of main sequencer 162 is defined by eight flip-flops, making it an eight bit device. The clock therein normally runs at forty kilohertz. The main sequencer 162, responds to two commands: add one to the present state or stop the clock until an event occurs. As will be described hereinafter the eight flip-flops drive two PROM's (Programmable Read Only Memories), one PROM feeding the inputs to the flip-flops and thus defining the next state of sequencer 162. The other PROM provides the instructions that are to be executed in the present state. For example, to raise the film gate 60 to allow for film threading, an appropriate command is generated on leads 170 and 172. The eight lines out of the instruction PROM are decoded as necessary; 256 combinations being possible on these eight lines although less are normally utilized. Sequencer 162 is programmed by setting up the PROM's to go through the correct sequence by standard techniques.

As sequencers 162, 164 and 166 go through the detailed sequence steps as appropriate, the rest of the blocks on the functional block diagram of FIG. 4 perform the specified operations. The microfilm recorder controller 174, provided by Terminal Data Corporation, Model No. DMF-3B interfaces between the main sequencer 162 and the microfilm recorder 180. The controller 174 and recorder 180 are stand-alone units and can operate to make fiche by themselves without the control features of the present invention. During the main exposure sequences, sequencer 164 instructs microfilm recorder 180 to advance to a preselected frame in accordance with the microfilm format selected. However, the titling and page numbering operations require that the main sequencer 162 take detailed control of the microfilm recorder 120. The format switch (not shown) on the front of the microfilm recorder controller 174 is overriden by the main sequencer 162 which then generates the particular direction, magnitude and polarity commands that are required. For example, at the start of a titling or page numbering operation after some exposures have occurred, a fiche advance command is generated so that the fiche transport within recorder 180 ends up on cell one, row one of the next fiche. Then a retrace operation is completed to move the fiche back to cell one, row one of the present fiche of interest. In order to do this retrace, the format switches on the microfilm recorder controller 174 is scanned by the main sequencer 162. That is, the column pitch, column margin, and number of columns of the fiche must be determined and then used by the sequencer 162 as it controls this retrace. During page numbering, the paging information is transferred from the page counters to the page lamp drivers in the camera frame, and then the exposure is made. The microfilm recorder controller 174 gets frame advance information after each page is printed.

Once the retrace is completed back to cell one of the present fiche, the microfilm recorder 180 must be indexed all the way across the film for the titling operation because the entrance aperture 128 for the titling information is through a different aperture than the entrance aperture 129 for the main images. Taking control of the titling memory bank 152 the main sequencer 162 moves the cursor from titling slot to titling slot transferring the information from the memory bank 152 over to the titling disc system 100 and incrementing the microfilm recorder 180 as appropriate. After each line of title is printed, the microfilm recorder 180 is moved back across the film, a retrace is done along the film, and then moved across the film again. During a complete titling operation, three complete traverses across the film, along back across the film, back along the film, and over again.

Figure 5:
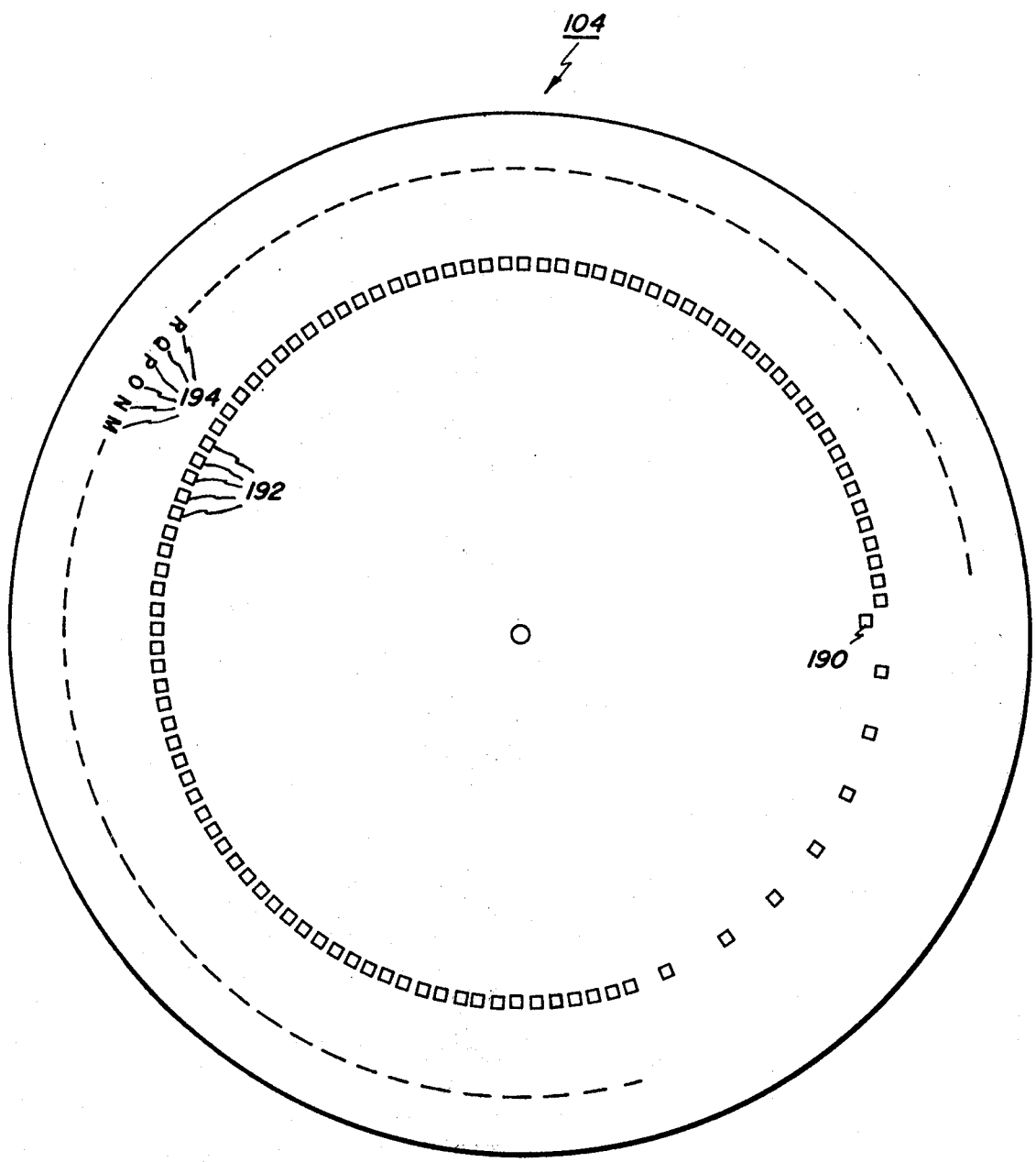
FIG. 5 is an illustration of the character disc employed in the optical titling system of the composing reducing camera.

FIG. 5 illustrates the character disc employed in the optical titling system. The actual title printing is done by a flash lamp 102 located behind a character disc 104. The main sequencer 162 energizes flash lamp modulator 160 and sends information to be transmitted to the titling system 100 via lead 184 by providing an enabling signal on lead 186. There are two information tracks on disc 104, shown in more detail in FIG. 5, that are read continuously. One track has a single mark 190 per revolution; this mark sets up a counter to a reference location. The other track has a plurality of marks 192 which gives output pulses exactly in synchronism with characters 194 on the disc. As the disc rotates from the reference location, the counter increments continuously. A comparison is made between the contents of this counter and the ASCII code of the character of interest. When a match is detected, the flash lamp 102 is triggered.

Figure 6:
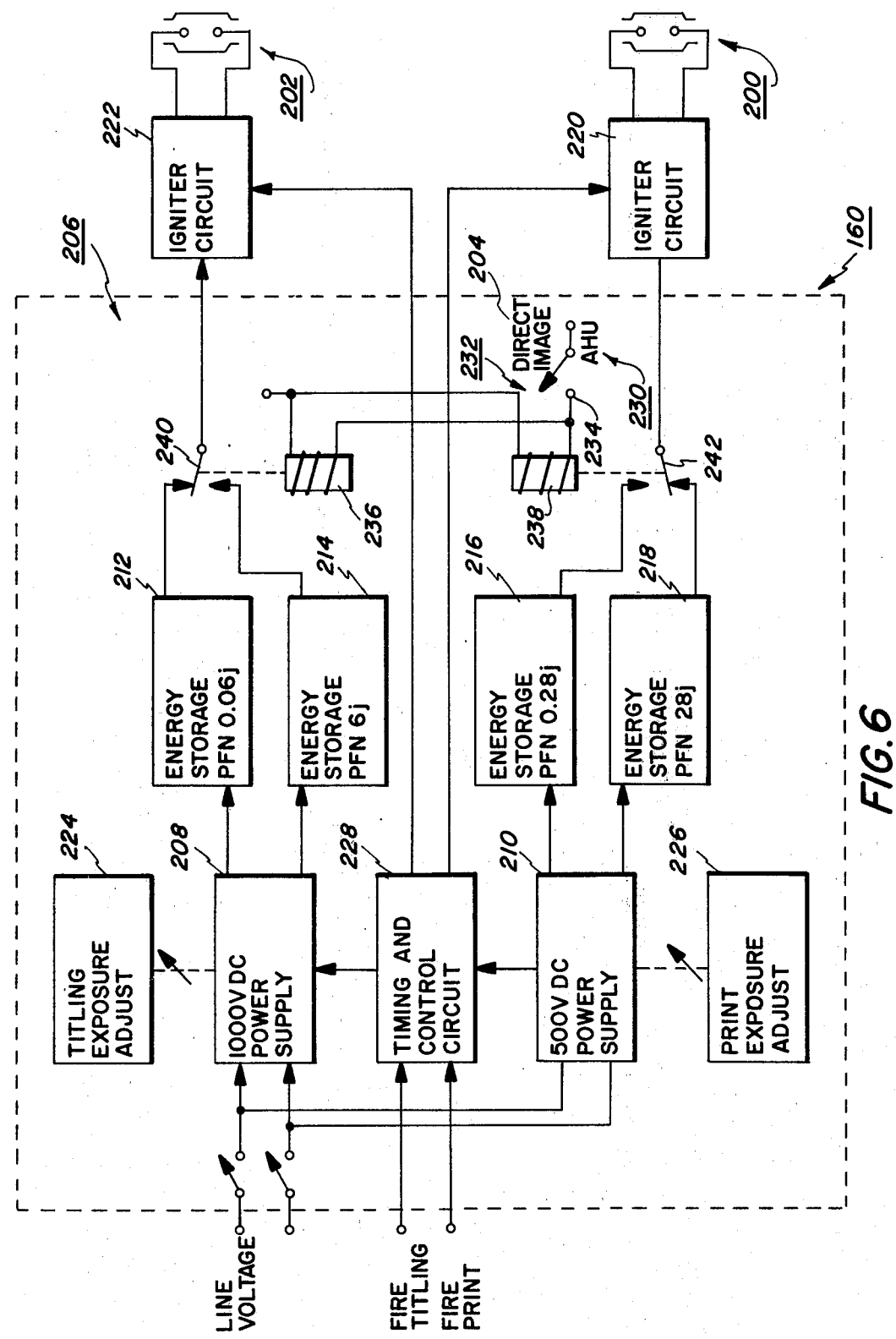
FIG. 6 is seen a block diagram of the flash lamp modulator.

In FIG. 6 there is seen a block diagram of the flash lamp modulator. The flash lamp modulator 160 includes the power supply for two flash lamps, the main exposure or print lamp 200 (within illuminator assembly 86 shown in FIG. 1) and the titling lamp 202, in respective channels 204 and 206, both channels functioning in a similar manner. The line voltage, buffered by a constant voltage transformer, is used to charge main capacitor banks 208 and 210 to a substantially constant voltage, 1,000 volts and 500 volts, respectively. Pulse forming networks 212 and 214 are charged from main capacitor bank 208 through a resonant LC circuit (not shown) and pulse forming network 216 and 218 are charged from main capacitor bank 210 through a resonant LC circuit (not shown).

In essence, the system illumination system comprises the five major subassemblies shown in FIG. 6 as follows: (1) the flash lamp power supply (modulator 160); (2) the printer igniter circuit 220, (3) the print flash lamp assembly 200; (4) the titling igniter circuit 222, and (5) the titling flash lamp assembly 202.

The flash lamp power supply 160 consists of a 1,000 VDC power supply 208 which charges two titling channel energy pulse-forming networks 212 and 214, a 500 VDC power supply 210 which charges two print channel pulse-forming networks 216 and 218, a titling exposure adjust control 224, a print exposure adjust control 226 and timing and control circuit 228.

The timing and control circuit 228 receives "fire print lamp" or "fire titling lamp" command signals from main sequencer 162 and in response provides a "fire lamp" command signal to ignite circuit 220 or 222 as appropriate. After a sufficient time delay to allow completion of the firing cycle, timing and control circuit 228 provides a "recharge the PFN" command signal to the appropriate energy storage PFN's 212, 214, 216 or 218.

The Direct Image/AHU control 230 selects whether the high-energy PFN's (214 and 218, respectively) or the low-energy PFN's (212 or 216, respectively) will be utilized and is dependent on the type of microfilm utilized. With switch 232 in the position shown, PFN's 212 and 218 are coupled to their respective igniter circuits and with switch 232 at contact 234, solenoids 236 and 238 are energized and the respective contact arms 240 and 242 are moved to the other contacts whereby PFN's 214 and 216 are coupled to their respective igniter circuits. The exposure intensity adjustment made by units 224 and 226 provide a means to adjust lamp output pulse intensity for either input or output film characteristics.

Figure 7A:
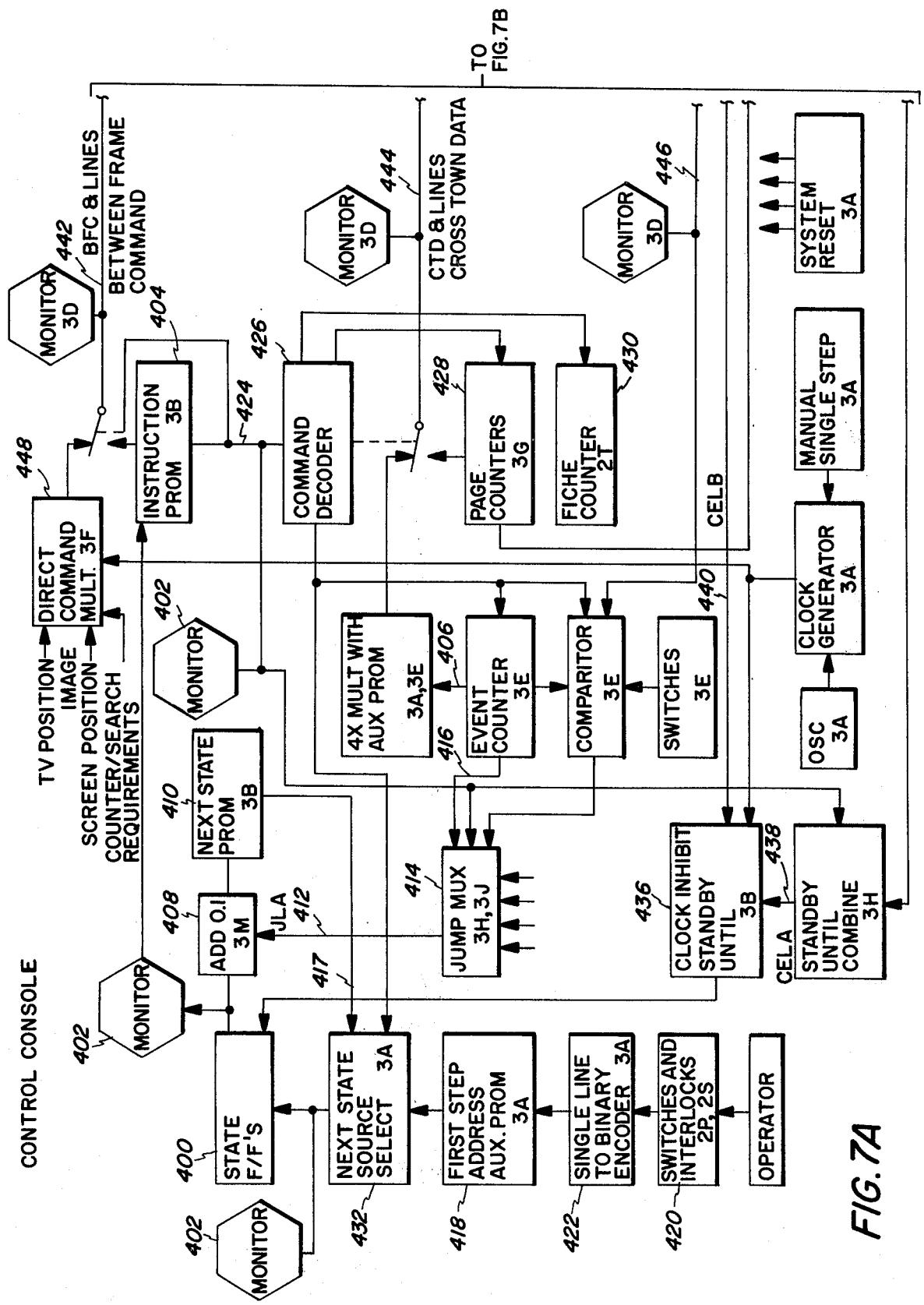
FIGS. 7A and 7B is a block diagram of the main sequencer electronics.
Figure 7B:
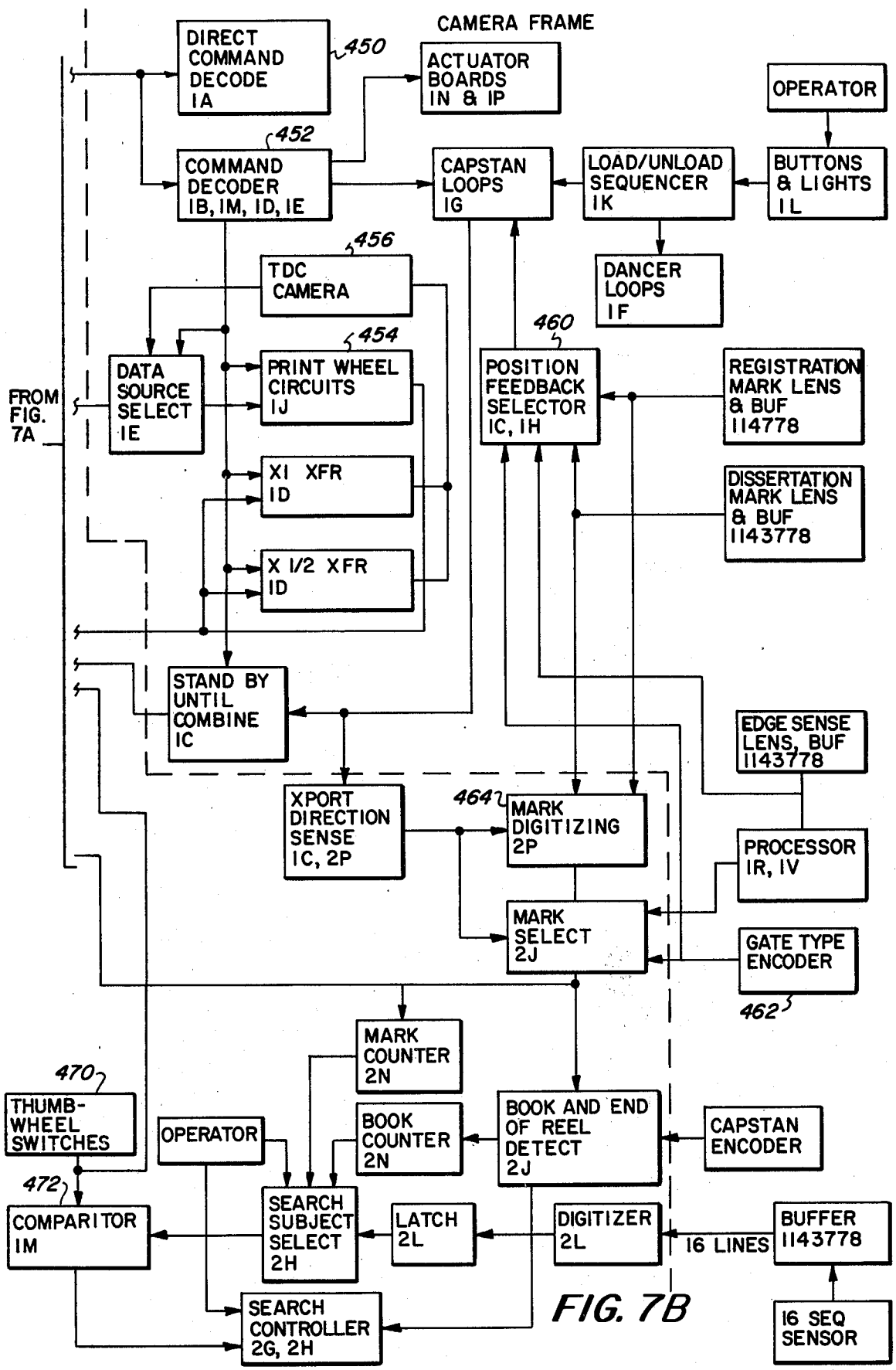

In FIG. 7 is seen the main sequencer 162 of the system in block diagram form. The state flip-flop 400 defines the present state of the main sequencer 162. These flip-flops are externally monitored by a set of light-emitting diodes 402. The state flip-flops 400 drive an instruction prom 404 whose outputs are monitored by light emitting diodes 402. The output of instruction prom 404 cause various events to occur in the system including incrementing event counter 406, raising the film gate 60, triggering the flashlamp, etc. The state flip-flops 400 also drive, through a 0, 1 adder 408, the next state prom 410. The next state prom 410 determines the order in which tasks are executed. For example, if the system is in state 18, next state prom 410 may command the system to go to state 71; if in state 93, go to state 32; if in state 107, go to state 210. It should be understood that the instruction prom 404 is simultaneously executing tasks at each state mentioned; the next state prom 410 organizing the sequence in which these things are being accomplished. The proms 404 and 410 interact at preselected times. The inter action occurs at the 0, 1 adder 408. The instruction prom 404 outputs can multiplex a variety of logic signals into the JLA line 412 via multiplexer 414 so that JLA can be high or low. For example, it may be necessary to know if the event counter 406 is at zero. If it is, main sequencer 162 will be directed to operate in a first mode and if the event counter is not zero, the main sequencer will operate in a second mode.

When instructed by instruction prom 404, the Event Counter Zero line 416 is connected to the JLA line 412 and the address to the next state prom 410 will be the present state or the present state plus 1 if line zero is high (logic "1"). Thus, the result of an instruction influences the path that the sequencer then takes. The next state that the sequencer is going to is monitored by LED's 402.

Since there is a variety of routines stored in the next state prom 410, a technique is provided to get to the starting state of the routines. In other words, the final state for all routines is state 0. The instruction for this state disconnects the next state prom 410 from the next state bus 417 and connects in auxilliary prom 418 with the inputs to the auxiliary prom coming from the front panel switches 420. The signal that results from an operator hitting a switch is subject to interlock checks within switches 420 before being sent to a binary encoder 422 that selects an address in the auxiliary prom 418 which, in turn, tells the state flip-flops 400 where to go to start a routine. It should be noted that the interlocks and initial addresses may be accomplished with the next state and instruction proms 410 and 404, respectively if desired.

The discussion set forth hereinabove described how the sequencer 162 goes from state to state. Regarding the instruction prom 404 in more detail, individual instructions are decoded from the eight-line instruction prom output on line 424 in command decoder 426. The decoded instructions operate, for example, reset front panel switches 420, increment the page counter 428 after each exposure, increment the fiche counter 430 after each fiche is produced, increment and reset the event counter 406, setting up the auxillary prom 418 for starting state selection by controlling next state source select device 432, stopping the sequencer for a pause, etc.

The stopping of the sequencer for a pause requires more explanation. When, for example, the sequencer requests the film gate 60 down, it is appropriate to wait 30 milliseconds to be sure the gate is in fact down before continuing onward. The next instruction triggers a multivibrator that, besides doing timing, inhibits the clock 436 to the state flip-flop 400 by pulling the CELA line 438 down. CELA 438 is also pulled down when, for example, the film transport 64 is commanded to move. CELA, line 438, will stay down until a mark is detected on the film 70. If the source of delay is in the camera frame, CELB line 440 is used to stop the clock. Examples of camera delay are waiting for the camera to finish cycling, waiting for the film transport 64 to stop on a mark once it is instructed to stop, etc. Therefore, the synchronous output from clock sequencer 436 may interact with unclocked (asynchronous) signals from remote equipment.

Three 8-line data buses 442, 444 and 446 connect the control console to the camera frame equipment. The Between Frame Command bus 442 carries the instruction prom outputs over to the camera frame when required. Otherwise, this bus is controlled by the direct command multiplexer 448 and decoders 450 and 452. Multiplexer 448 and decoder 452 control, for example, the TV camera, and the film transport 62 during search operations. The Cross Town Data bus 444 carries the ASCII code for the character or logo segment to be printed or the distance that the camera is to move. This data is inputted to the print wheel latch 454 where it is used to transferred to the fiche camera 456. The contents of the print wheel latch 454 are sent back on the Cross Town Return bus 446 for verification and checking purposes.

The film transport 64 is activated by the operator loading the film and hitting the load button on the control console. The load sequencer tensions the film by bringing up the dancer arms. Once this is done, the capstan loops respond to four different speed requests, which are all the possible combinations of fast and slow, forward and reverse. Means on the film gate 60 sends signals to the position feedback selection circuits 460 to do the signal processing required for the various types of mark sensors.

The only signals that the sequencer 162 sends to the film transport 64 are requests for four different speeds, fast forward and reverse, slow forward and reverse. The dancer arms servos (not shown) operate independently of the main sequencer 162 and are driven by load/unload sequencer 166. Proper operation of the film transport 64 requires an integrator to be driven by a tachometer attached to capstan 66. The presence of a film mark is only spotted when the frame of interest is already in the film gate 60. Though the film advance command is cancelled immediately by sequencer 162, considerable overshoot will occur as a result of the controlled deceleration. The tachometer integrator records the amount of the overshoot and uses this information to drive the film transport 64 back to where it should be as described in the aforementioned copending application. Thus the sequence for moving the film 70 is: command slow forward, hold the sequencer clock until a mark is observed, cancel the speed command and enable the tachometer integrator, and wait until the tachometer integrator cycles and goes back to zero.

The film gate encoder 462 and the several mark signals are sent to the control console for digitizing in digitizer 464 and the digitized signals are used to tell the sequencer when the film has a mark on it. The digitized signals are also counted, both directly for frame-by-frame accountability and in blocks for book-by-book accountability. The operator has the option of displaying one counter or the other.

The operator also has the option of searching for the desired frame number or book number by initiating a search. The search limit is set up on switches 470 which can also be used to jam set the page counters. The search subject, besides the book or frame counter already mentioned, can be a 16-bit BCD code recorded on the front edge of certain films. The search proceeds until a comparator 472 indicates a match between the search subject and the switches.

Figure 8B:
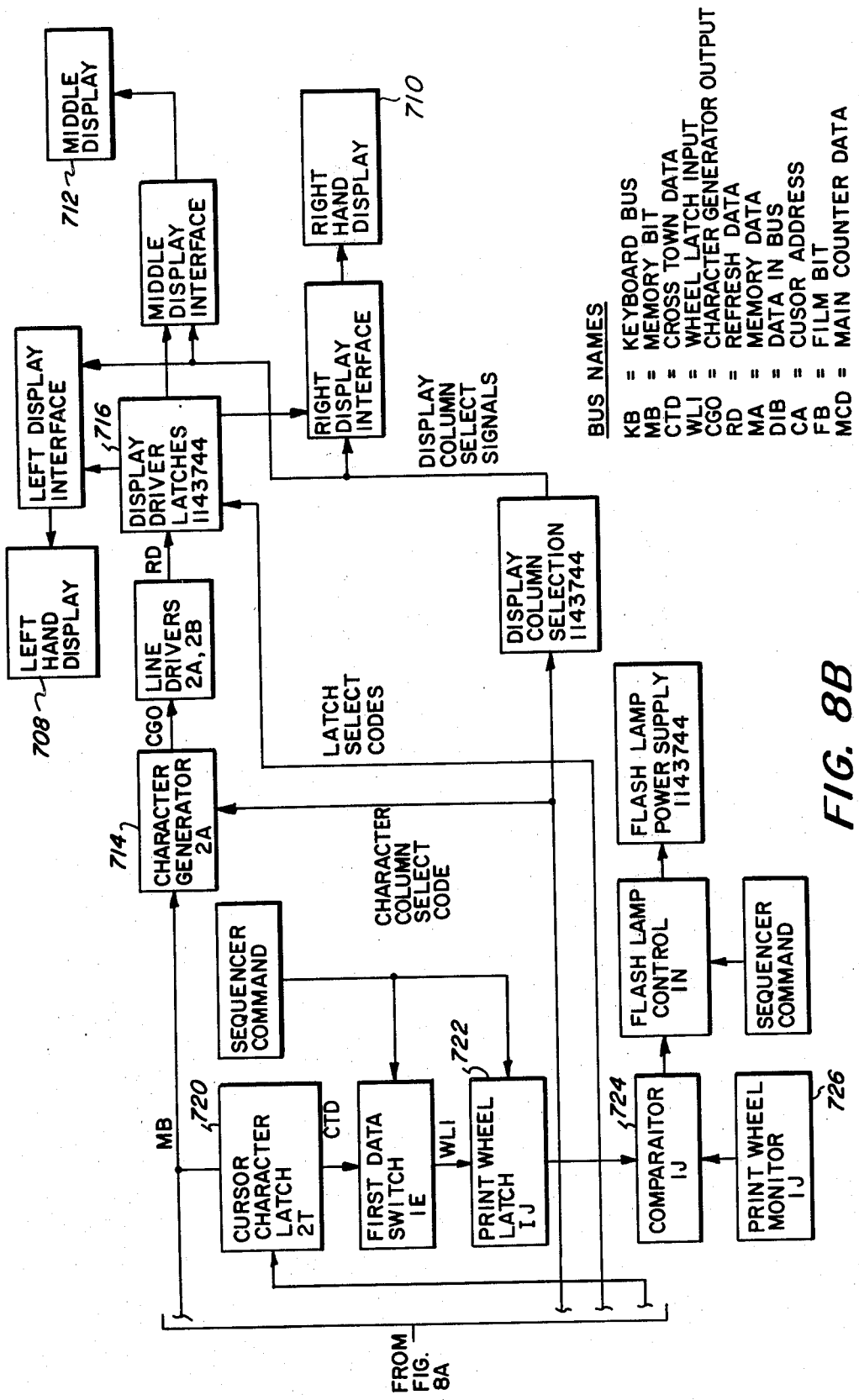

The page counters 428 provide the reference for the main sequencer 162 as it puts page numbers on the exposed areas of the fiche and a schematic diagram thereof is shown in FIG. 8. One of two sets of counters is incremented every time an exposure is made so the sequencer knows how far it has to go. The second set of counters is incremented every time page numbering is actually completed. The page-numbering sequence steps then when the two counters match.

In FIG. 8 is seen the titling system block diagram. All the data used in the actual titling operation or shown on the titling display passes through memory bank 700. The memory bank 700 is used most often for refreshing the titling display, so it is the refresh counters 702 that have primarily control of the memory address bus 704. The Cursor Address bus 706 is connected to the Memory Address bus only when the refresh counters are active.

The titling display is a set of gas discharge panels which must be refreshed regularly and often. The gas that generates an individual dot will glow for a considerable length of time after it is excited; the ratio of excitation time to glow time is about 1 to 160 as long as the glow time is not too long. The displays are organized for refreshing one dot column at a time, so their data input requirement is row oriented. That is, it must be determined for the present dot column, which of the 8 rows that compose a character and the cursor should be excited or unexcited. All this data must, of course, be transferred during a time that is short with respect to the length of time spent exciting a column. About 1/30 of the excitation time is used for the required data transfer.

The purpose of the refresh counters 702 is to control this refresh data transfer by sending the appropriate dot column select signals to the display interfaces 708, 710 and 712. The memory bank 700 is then cycled for the required character, control being processed through a character generator 714. The results are stored in a set of latches 716. The character generator 714 combines the ASCII code that is used in the memory bank with the character column requirements to generate the actual display row information that is required. That this information must be stored in temporary latches should be obvious from the refresh requirements of the display. The alternative of holding the memory bank address fixed during a column refresh time would allow refreshing only one character row at a time.

The refresh counters 702 establish the time reference for the titling display system. However, the sequencer 162 runs on a completely different clock. The data transfer from one time domain to the other is accomplished by transferring the data pointed at by the cursor to latch 720. This transfer is done once every refresh cycle. Thus, the information that the sequencer is interested in is available within two sequencer clock cycles from the time that it moves the cursor. The sequencer 162 moves the data from this latch to the print wheel latch 722 and then triggers the flashlamp when the comparator 724 indicates that the print wheel latch 722 and the print wheel monitor 726 indicates that the correct character is in position.

There are two counters which control data entry into the titling system memory bank 700. The I/O Counter 728 sets up the location for data input from the keyboard 34 (FIG. 1) and it is used by the sequencer to control the order in which a title is printed. Right after the refresh counters 702 have loaded up the latches for display circuits, an inquiry is made of the keyboard to see if any data needs entering. If there is, the Keyboard Bus 732 is connected to the Data Input bus 734. Regardless of the data entry, the I/O counter 728 is connected to the Cursor Address bus 706 and the latch 720 is refreshed. In addition to taking clock signals from the keyboard strobe line 734, the I/O counter 728 can be incremented, up and down, by front panel controls 736 and 738. The front panel controls clear key jambs the Keyboard bus 732 to the ASCII code for blanks and rapidly cycles the I/O counter 728.

After the refresh counters 702 have allowed the I/O counter 728 some time, the fourth line drive circuits 740 are allowed access to the Cursor Address bus 706 and the Data Input bus 734. The fourth line drive 740 examines various counters and latches and displays their contents on the fourth line of the titling display. Appropriate messages are also shown so that the meaning of the numbers is obvious. The counters, and their corresponding messages, are selected by the operator. Since the counter in the fourth line drive is incremented only once for every refresh cycle, it takes a considerable length of time to scan the fourth line.

The following describes various control functions performed by the present invention.

I. FILM LOADING CONTROLS Main Frame Unit

1. LOAD

After 35 mm film has been properly threaded on the film transport system, depression of this control causes the 35 mm film to be "loaded" in the system so it can be transported from reel-to-reel in either automatic or manual modes. This is accomplished by activating the capstan, supply reel and take-up reel servo systems together with the pinch roller and dancer arms, to apply proper tension on the film. On activating this control, the operator should continue to depress the switch until the dancer arms come to rest in an approximately horizontal position (about 1 second). The indicator lamp on this switch will remain lit if the film is properly loaded.

2. UNLOAD

This control returns the 35 mm film transport to the "unload" configuration.

3. FAST FORWARD

This control causes the 35 mm film to be transported in the forward direction (from supply reel to take-up reel) at a rate of 100 inches/second. The switch must remain depressed for the function to continue. If the film supply runs out while this switch is depressed, the system will revert to the "unloaded" configuration and all film drive functions will be disabled.

4. FAST REVERSE

This control causes the 35 mm film to be transported in the reverse direction (from take-up reel to supply reel) at a rate of 100 inches/second. The switch must remain depressed for the function to continue.

5. FRAME ADVANCE FORWARD

This control causes the 35 mm film to advance forward to the next frame at 15 inches/second and stop in a registered position in the film gate. Uses dissertation cut marks, registration marks or a frame edge for registration depending on the film format and film gate being used in the system. The TV viewing system remains active during this operation. The control is inhibited if the manual enable or expose enable switches are activated, if the microfilm film transport is unloaded or if the fiche system is not ready.

6. FRAME ADVANCE REVERSE

This control causes the 35 mm film to advance in the reverse direction, in the same manner as the FRAME ADVANCE FORWARD control and with the similar restrictions.

7. FILM ADVANCE

This control (knob attached to single-turn potentiometer) allows the operator to advance the 35 mm film forward or reverse at a rate proportional to the angular displacement of the control know from its center (null) position. Using this knob the maximum transport rate is about 0.8 inches/second. The TV camera system is active during this operation and the operator can therefore visually position a selected frame with respect to a fiducial mark in the film gate, or the defining edge of the film gate. The manual switch must be on for this control to operate.

8. MANUAL EXPOSURE

Depression of this control causes the system to make a single exposure on the fiche film of the image located in the film gate. All of the normal events of an automatic exposure will occur, except for automatic advance of the 35 mm film which must be accomplished by the operator using the film advance control. In this mode of operation, the TV viewing system will be active before and after each exposure. The manual enable switch must be on in order for this switch to be activated.

9. DATA ENTRY

This is a four digit level-wheel switch by which an operator can set any four-digit number for use in SEARCH, STOP PRINT AT, or PAGE NO. SET operations.

10. REGISTRATION MARK NO.

This control selects the registration mark number, as shown in the DATA ENTRY switches as the criteria for terminating a search operation or for setting a stop-print-at limit. When this switch is on, the registration mark number currently stored in the registration mark counter will appear.

A registration mark is defined as a dissertation cut mark or a normal system registration mark. The film gate 20 installed in the system automatically selects which type of registration mark is of interest.

The registration mark counter is set to zero at system turn on, or when the REGISTRATION MARK ZERO switch is depressed. The counter increments up or down depending on the direction of film motion.

The registration mark counter is inoperative when the MANUAL EXPOSURE switch is on.

11. FRAME SERIAL NO.

This control selects the frame serial number, as shown in the DATA ENTRY switch, as the criteria for terminating a search operation or setting a stop print at limit. A frame serial number is a special BDC coded 16 bit code located on the 35 mm film. A special film gate is used if this mode of operation is selected. When this switch is on, the frame serial number last read will appear on the fourth line of the titling display.

12. BOOK NO.

This control selects the book number as shown in the DATA ENTRY switch as the criteria for terminating a search operation. The end of a book is recognized by the absence of a registration mark for a distance on the fill exceeding 24 inches. During automatic operation the system always stops printing at the end of a book.

13. SEARCH FORWARD FOR

This control initiates a high-speed search of the 35 mm film at a rate of 100 inches/second in the forward direction. The search is conducted for the registration mark or book of frame (whose number is dialed into the DATA ENTRY switches) as selected by the REGISTRATION MARK NO., FRAME SERIAL NO. or BOOK NO. switches.

14. SEARCH REVERSE FOR

Same as above but search is in reverse direction.

15. STOP PRINT AT

Selection of this switch sets a limit on the automatic printing of 35 mm film frames. Printing will stop at the registration mark number or frame serial number selected in the DATA ENTRY switches. The current registration mark number or frame serial number is displayed on the titling display.

The next four function switches are used to establish the titling format to be used on the fuse.

16. LONG TITLE

Turning on this switch sets up the long title format extending along most of the fiche title area. When the TITLE switch is activated, the fiche title will be generated in a format of 3 lines of 93 characters maximum per line. This may not leave any space for a logo in the standard A1 fiche format.

17. SHORT TITLE LEFT

Turning on this switch sets up the short title left format. When the TITLE switch is activated, the fiche title will be generated in a format consisting of 3 lines of 75 characters maximum per line plus a space for a logo at the right-hand end of the titling space.

18. SHORT TITLE SPACE

Same as above but title placed to right, with space for logo at left.

19. EXPOSE ENABLE

This control, when activated, allows any of the following five controls to be used: SINGLE FRAME, AUTOMATIC, TITLE, PAGE NO. and FICHE ADVANCE. Its purpose is to assure that activation of any of the above controls is deliberate rather than accidental or inadvertent. Further, activation of this switch disables the film transport controls on the main frame.

20. SINGLE FRAME

Activates the system to perform all automatic functions required to expose microfiche and advance the 35 mm film, one frame at a time.

21. AUTOMATIC

Activates the system to perform all automatic functions required to expose microfiche and advance the 35 mm film, in a step-and-repeat manner until an event occurs that is programmed to abort the command. In the general case, the automatic fiche-making sequence will abort: (1) When the FICHE FULL condition is reached, i.e. when the fiche format selected on the microfilm recorder controller has been completely filled with exposed frames, or (2) an END OF BOOK condition has been reached, i.e. when the end of a series of frames on the 35 mm film designated by at least two feet of clear leader (trailer) with no fiducial marks has been reached.

22. TITLE

This control activates the automatic optical fiche titling system and causes the title in the titling display (first three lines) to be imaged on the fiche according to the format selected from the LONG TITLE, SHORT TITLE RIGHT, SHORT TITLE LEFT, and PRINT LOGO switches. The title display is addressed from the typewriter keyboard directly in front of the main control panel. The font and logo characteristics of the title produced are controlled by the specific make-up of the rotating font disc used in the photo-composer. The cursor of the titling display moves from character to character as the title is being produced. The title remains stored in memory from fiche to fiche unless it is changed by the operator, i.e. the title composition need only be changed as required, not completely retyped.

23. PAGE NO.

This control activates the automatic fiche page-numbering system and causes each fiche frame to be individually numbered according to a programmed routine. The page number registers must be set or be at the number to be placed on the first image on the fiche prior to initiation of the AUTOMATIC or SINGLE FRAME operation. The pages on the fiche will then be sequentially numbered until all images are numbered. If the first page of the fiche is to be numbered 001, then the page number register must be set to this number using the PAGE COUNT SET control and DATA ENTRY switches before making fiche exposures. This function is activated after the frames have been exposed on the fiche. No additional frames on the same fiche may be exposed after this control is utilized.

24. FICHE ADVANCE

This control causes the microfilm camera to advance to the next fiche position. Fiche cut marks are imaged onto the fiche during this operation.

The system also includes MAIN CONTROL PANEL SYSTEM STATUS INDICATORS as follows:

1. FICHE EXPOSED

When this indicator is lit, at least one fiche frame has been exposed.

2. PAGES NUMBERED

When this indicator is lit, the fiche just processed has been page numbered in accordance with the automatic page-numbering routine.

3. FICHE TITLED

When this indicator is lit, the fiche in process has been titled in accordance with prior set-up instructions.

4. END OF BOOK

When this indicator is lit, an end of book condition is presently in force.

5. FICHE FULL

When this indicator is lit, the fiche under process is full, i.e. all fiche frames have been exposed, or titled after exposures, or page numbered.

6. FICHE CAMERA BUSY

When this indicator is lit, the microfilm camera is in the busy state. (This indicator is continually blinking when fiche-making operations are in progress.

7. CAMERA READY

When this indicator is lit, the fiche camera is ready to expose images.

The typewriter keyboard portion of the main control unit provides control functions in addition to entering titling information to the display and to the optical printing disc.

In particular, the following control functions are provided:

HOME

The HOME function sends the cursor on the titling display to the home position, i.e. to the first space on the first line of the titling display.

CL

The control performs the clear function which erases the first three lines of the titling display.

Cursor Controls

Consists of four keys with arrows pointing right or left. The black keys advance the cursor one space at a time either forward (arrow pointing to the right) or reverse (arrow point to the left). The red keys advance the cursor 16 spaces at a time either forward (arrow point-ing to the right) or reverse (arrow pointing to the left). These keys are used to gain rapid access to the various parts of the titling display.

TV Camera Positioning Controls

Consists of four black keys with arrows, that when depressed moves the image on the TV screen up or down, or right and left, depending on which key is depressed. The TV camera is mounted on a motor-driven mount, which moves the position of the camera so that any part of the 35 mm frame currently in the gate can be viewed on the TV screen.

Additional control functions provided include the control of the TV display and a technique for adjusting the position of the film 10 within the gate 20.

Microfilm Recorder Controls

The microfilm recorder used in the present invention is the Terminal Data Corporation MOdel DMF-3B modified to be controlled by the signals generated by the main sequencer 162.

In order to provide an understanding of the controls performed thereby, the standard functions performed by the recorder is set forth hereinafter. In essence, these controls and indicators are used to control fiche format and the camera and to monitor the condition of the camera. The modifications to the standard camera are described hereinabove.

FORMAT CONTROL SWITCHES

Format

A ten-position digital lever-type switch is used to select one of the three operational modes for the camera. When set to:
"0", the camera is set to column pagination mode.
"1", the camera is set to row pagination mode.
"2", the camera is set to linear mode.

Row-Rows

There are two ten-position lever-type switches defining the number of horizontal rows of images to be recorded per vertical columns.

Row-Pitch

There are two ten-position digital lever-type switches used to set the vertical distance between the optical center lines of each row. Each increment equals 0.1 mm.

Row-Margin

There are two ten-position digital lever-type switches used to set the vertical distance between the edge of the film and the optical centerline of the first row of images, minus four mm. One unit equals 0.1 mm.

Column-Columns

There are two ten-position digital lever-type switches used to define the number of columns to be recorded per fiche.

Column-Pitch

There are two ten-position digital lever-type switches used to set the horizontal distance between the optical centerline of each column. Each increment equals 0.25 mm.

Column-Margin

There are two ten-position digital lever-type switches used to define the horizontal distance between the right margin of one fiche and the left margin of the next fiche.

CAMERA CONTROL SWITCHES

Power

An alternate action push-button switch. When the switch is pressed and the indicator lamp is lit, power is applied to the camera and its control circuits. Power is cut off when the siwtch is pressed again and the indicator lamp is extinguished. Power is also applied to the vacuum/humidifier system when this switch is lit.

Reset

This is a momentary-type push-button switch. When pressed and illuminated, this switch clears all camera logic and initiates fiche complete signal which places film in home position (row one, Column one) of a new fiche.

Row Pitch +100

This is an alternate action push-button switch that when pressed and illuminated adds 100 to value indicated by ROW PITCH switches.

Cut Mark Inhibit

This is an alternate action push-button switch that when pressed and illuminated inhibits exposing of cut mark on film.

Fiche Advance

This is a momentary-type push-button switch that when pressed and illuminated advances film to home position (row one, column one) of next fiche and exposes cut mark.

Frame Advance

This is a momentary-type push-button switch that when pressed and illuminated advances film one frame in a row or column. The direction of the frame advance is determined by the setting of the format select switch. Frame advances will continue as long as this switch is depressed.

Row Margin +100

This is a two-position toggle switch that when set to the "on" position adds 100 increments to the value indicated by the ROW MARGIN switch.

CAMERA CONDITION INDICATORS

Film Low

This is an indicator which when lit indicates that the film is low or exhausted in the supply magazine.

Ready

This indicator indicates when lit that the camera is ready to expose image, i.e., correct voltage is applied to camera control logic, the camera doors are closed, film is correctly loaded, and film is not depleted.

Although the present examples were specific in terms of conditions and materials used, any of the above listed typical materials may be substituted when suitable in the above examples with similar results. In addition to the materials used to carry out the process of the present invention, other materials may be used if desirable. In addition, the system as designed may be configured to accept 35 millimeter input film with relatively minor changes. In addition, 16 millimeter input film may also be employed. Although the systems primary configuration is to produce microfiche, that is, 105 mm output film, any size film from 16 mm up to 105 mm could be produced as output so that it is to be understood that microfiche is not necessarily the only output. The titling disk configuration shown in the instant application is only one example of the type of information that may be employed in the disk, e.g. more data tracks with additional information could be employed including foreign languages. Logos, pictures, etc. The current system has been configured for black and white silver halide films as input and output. However, there is no restriction as to color input so that the system could be configured for color input and output. Consequently, color input film and color output film may be employed by providing the correct danchromatic reduction lens in the system.

What is claimed is:

1. A system for automatically producing microfilm or microfiche in a variety of formats and reduction ratios from roll microfilm input comprising:

a microfilm transport means for accepting rolls of input microfilm, transporting said microfilm to a filming gate, stopping and registering individual microfilm frames in said filming gate, a film exposure means for illuminating individual frames in the filming gate as the microfilm is automatically stepped frame by frame through the filming gate, a reducing lens means for imaging the input microfilm frames with high optical resolution at various reduction ratios to a focal plane, a microfilm recording means for accepting the reduced images from said reducing lens means at said focal plane within the recorder; said microfilm recording means being automatically controlled in synchronism with the microfilm transport means to position the output microfilm or microfiche in two dimensions in said focal plane of the recording device resulting in a plurality of reduced microimages being arranged in columns and rows corresponding to a preselected format, first sequencer means for controlling the microfilm transport means when a search is being executed whereby a selected and coded frame is registered in the film gate, second sequencer means for providing system operational and level commands, said second sequencer means comprising a microprocessor, and third sequencer means for controlling said microfilm transport means during the loading and unloading of said microfilm.

2. The system as defined in claim 1 further including a frame viewing means for displaying the contents of a selected microfilm frame.

3. The system as defined in claim 1 further including optical photocomposition means for providing titling information on a predetermined area of said microfiche when the output from the system is in a microfiche format.

4. The system as defined in claim 3 wherein said optical photocomposition means comprises means for entering data corresponding to said titling information and memory means for storing said data.

* * * * *